(12) United States Patent
Kramer

(10) Patent No.: US 9,589,055 B2
(45) Date of Patent: *Mar. 7, 2017

(54) SYSTEM AND METHOD FOR A MODULAR USER CONTROLLED SEARCH ENGINE

(71) Applicant: Nancy Kramer, Laurel, MD (US)

(72) Inventor: Nancy Kramer, Laurel, MD (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/300,426

(22) Filed: Jun. 10, 2014

(65) Prior Publication Data

US 2014/0289045 A1    Sep. 25, 2014

Related U.S. Application Data

(63) Continuation of application No. 13/159,395, filed on Jun. 13, 2011, now Pat. No. 8,751,541, which is a continuation of application No. 12/149,540, filed on May 2, 2008, now Pat. No. 7,987,208, which is a continuation of application No. 11/101,534, filed on Apr. 8, 2005, now Pat. No. 7,386,572.

(60) Provisional application No. 60/561,874, filed on Apr. 14, 2004.

(51) Int. Cl.
*G06F 17/30* (2006.01)
*G06Q 30/02* (2012.01)

(52) U.S. Cl.
CPC ... *G06F 17/30864* (2013.01); *G06Q 30/0256* (2013.01); *Y10S 707/99931* (2013.01); *Y10S 707/99945* (2013.01); *Y10S 707/99948* (2013.01)

(58) Field of Classification Search
USPC ............ 707/706, 709, 791, 792, 802
See application file for complete search history.

(56) References Cited

U.S. PATENT DOCUMENTS

| | | | | |
|---|---|---|---|---|
| 5,862,223 A | * | 1/1999 | Walker et al. | 705/50 |
| 6,236,978 B1 | * | 5/2001 | Tuzhilin | 705/7.29 |
| 6,421,717 B1 | * | 7/2002 | Kloba et al. | 709/219 |
| 6,643,661 B2 | * | 11/2003 | Polizzi et al. | 707/709 |
| 6,678,694 B1 | * | 1/2004 | Zimmermann et al. | 707/731 |
| 7,020,679 B2 | * | 3/2006 | Tian | 709/201 |
| 7,647,299 B2 | * | 1/2010 | Harik | 707/999.003 |
| 2002/0049689 A1 | * | 4/2002 | Venkatram | 706/45 |
| 2003/0182274 A1 | * | 9/2003 | Oh | 707/3 |
| 2003/0220912 A1 | * | 11/2003 | Fain et al. | 707/3 |
| 2004/0260679 A1 | * | 12/2004 | Best et al. | 707/3 |

* cited by examiner

*Primary Examiner* — Cam-Linh Nguyen
(74) *Attorney, Agent, or Firm* — Doster Greene, LLC

(57) ABSTRACT

Method and system for delivery of personal search services and advertising. The method includes collecting information from the user about the user's personal search engine, including, but not limited to digital content data sources, link crawl depth of those digital content data sources, and time interval to refresh the index of the digital content data sources created. In one embodiment of the present invention users do not pay a fee in return for allowing the provider to present advertising to the user as the user uses the invention. In another embodiment, advertisers purchase advertising display services from the provider to be displayed to specific users.

21 Claims, 12 Drawing Sheets

User Controlled Search Engine System

Advertising Supported Personal Search Engine

Paid Personal Search Engine

Advertising User Access Process

Personal Search User Agreement Process

User Provides Personal Search Engine Characteristics Process

Personal Search Process

Display Advertising Process

Personal Search System Block Diagram

Typical Computer System

SYSTEM AND METHOD FOR A MODULAR USER CONTROLLED SEARCH ENGINE

RELATED APPLICATIONS

This application is a continuation of, and claims priority to, U.S. patent application Ser. No. 13/159,395, filed Jun. 13, 2011, now allowed, which in turn claims priority to, U.S. patent application Ser. No. 12/149,540, filed May 2, 2008, now allowed, which in turn claims priority to, U.S. patent application Ser. No. 11/101,534, filed Apr. 8, 2005, now U.S. Pat. No. 7,386,572, which in turn claims priority to U.S. Provisional Patent Application No. 60/561,874, filed Apr. 14, 2004, all of which are expressly incorporated herein by reference in their entirety.

FIELD OF THE INVENTION

The present invention relates to a system and method for indexing digital content resource files and searching that index. In particular, the present invention relates to a system and method for users to control how the index is built and the digital content resource files from which it is built.

BACKGROUND OF THE INVENTION

The World Wide Web (the Web) represents all of the computers on the Internet that offer user access to information on the Internet via interactive documents or Web pages, which are digital content resource files. Web information resides on Web servers on the Internet or within company networks. Web client machines running Web browsers or other Internet software can access these Web pages via a communications protocol known as Hypertext transport protocol (HTTP). With the proliferation of information on the Web and information accessible in company networks, it has become increasingly difficult for users to locate and effectively use this information. The reason for this is that there is too much information for search engines to update their index to reflect every change on every digital content data resource in a timely fashion.

The full text index is created by the search engine's software from digital content resources retrieved by their crawler software from the site. It enables the returned digital content resource to be searched by keywords, which point to the original site from which the digital content with that keyword was obtained. Search engines have proprietary algorithms which order the search results for a given keyword by relevance and display the sites in the order of most relevant to least relevant. Different algorithms can yield widely differing results and even the best algorithms have trouble determining the context of the search term. The process of retrieving the digital content from many different web sites and creating a full text index is resource and time intensive requiring significant computer resources and bandwidth when a large number of site indexes need to be updated. Public search engines contain a very large number of sites, which makes updating their index a significant and expensive endeavor. The general solution to this problem by the search engines is to allocate their scarce resources by limiting the update frequency of most of the sites in their index. Only the sites deemed most "important" by the search engine will have their indexes updated frequently. The information in the index of commercial search engines currently in the practice of the art for the vast majority of sites will be one to three months old. Even though a given site may not be important to the commercial search engines currently in the practice of the art that site could be very important to a searcher who might require the most current information from that site.

The result of these circumstances is that sites not highly rated by automatic algorithms used by commercial search engines currently in the practice of the art may not be updated in a timely manner, even if files on the site have been updated. Since commercial search engines use automatically executed algorithms to determine which sites are suitable for inclusion in their index, and how often to refresh the index of any given site, Web sites containing useful information may not be listed, listed early enough, or listed in a sufficiently timely manner in the index or the search results to be discovered by interested searchers. As a result, searchers may not be able to find important information because it is not in the search engine index and therefore cannot be retrieved or the relevancy of the result is ranked so low by the search engine that the searcher would have to go through hundreds or even thousands of listings to find the information they want. This is highly inefficient from the searcher's perspective. The current invention solves these problems for the searcher.

In addition, commercial search engines refresh their index data at a rate that is not suitable for many applications that require timely information, such as finance, political issue tracking, business news analysis and other subjects, such as those pertaining to health issues.

There are currently two types of digital content index and search available, non-customizable search and customizable search. Both place limits and burdens on the searcher that may result in available information not being found.

Standard search engines give the searcher no control over the information resources (digital content files) that are included in the search engine, how frequently the index is updated or the depth of the links included in the index. Searchers can suggest digital content resource data files to be included but there is no guarantee that they will be included. Instead, the search engine's management controls which digital content resource data files will be included. Search and ranking is usually done using some proprietary algorithm. These algorithms are frequently changed without notification of search users, and, consequently, Web sites can disappear without notice from a searcher's list of results. Furthermore, because a proprietary algorithm is used, the effects of these changes cannot be accurately understood, or compensated for, by searchers. As a result the searcher may not be aware of important information because it is not in the search engine's index of results.

There are some customizable search engines. However, all of the customizable search engines have limitations and/or create burdens for the searcher. Customizable search engines which use personal computers as the platform for the search software permit the searcher to choose the digital content information resources (e.g., magnetic or optically stored files) to include in the index. The user can also designate when to refresh the index and can set the link depth to include in the index, however there are burdens. The user must install the "customizable search engine software" on their computer. When the software retrieves digital content resource data files for the index it may overload the user's network connection or make the connection unavailable for other uses, potentially for long periods. As a result, such software is highly likely to prevent users from performing other tasks while the software runs. The search and index function in personal computer-based customizable search software uses the personal computer's processor, memory and hard disk, which limits search power and index size to the hardware on that personal computer. Thus, personal computer-based customizable search software may keep the user from being able perform other functions on that personal computer due to insufficient resources. Due to the previously enumerated burdens, this type of customizable search software has serious usability drawbacks for the user.

SUMMARY OF THE INVENTION

The present invention provides a method for indexing and searching digital content resource data files that is easy and more efficient for the user to use and overcomes drawbacks of conventional systems.

In one embodiment of the present invention, the user can control all major characteristics of building the full text indexes from a standard user interface. These characteristics include the digital content data resource files to be indexed, the refresh time interval for the index and the maximum link depth to follow from the initial digital content data resource files for the index. This allows the user to avoid installing any software or knowing how to program a computer. The standard user interface can be employed by any browser capable device such as cell phones, PDAs, computers, etc. The user merely enters their digital content resource information, crawl depth criteria and refresh criteria into the user interface and this information is passed to the proper software components to build the full text index. The user can choose to either pay for the ability to create a personalized searchable index, or use the free advertising supported version of the invention. Because there is a free version, anyone with access to a network can use it without expense. This will make it especially useful for students and others with limited resources.

Since the user can control the refresh rate for the searchable full text index, the information in the index will be timelier than that in non-customizable search engines. The user only includes the digital content data resources that are of interest to his or her research, making the searchable full text index more accurately targeted to the research topic. For example, if a user is performing research on a particular industry, the user would only include sites in the index that pertain to that industry. By setting the depth of the links to follow the user can create a very inclusive index of those sites by following their links deeply.

The search results will be more contextually relevant because a user who is interested in the subject matter chooses the digital content data resources. A person has a much greater ability to understand context than software algorithms. In this embodiment, the searcher will chose the digital content data resources, which ensures that they are contextually relevant and the search will find more contextually relevant results. For example, conventional software algorithms such as Google's Page Rank algorithm do not understand context If a user is looking for "rose pictures," a search engine such as Google would include pictures of Axel Rose, the rock star in the results, even though the user is only looking for pictures of roses that are flowers. A person would immediately know that a picture of Axel Rose is not a picture of a flower, but search algorithms do not.

In another embodiment of the present invention, the user can build their index with only digital content data resources that pertain to pictures of roses that are flowers. This is easy for a user to determine but nearly impossible for standard search engines to determine accurately.

Since most Web sites have a page with links to related sites, following links deeply from the original digital content data resources can also be used to discover new contextual digital content information resources. Furthermore, the Internet in general and the World Wide Web in particular serve as platforms for display and retrieval of specific information placed for public access by persons having expertise in specific areas of knowledge, the content of which is moderated by those who access that information. Thus, both the Internet and World Wide Web are organized into loosely-knit, self-selecting communities of contextual knowledge experts. Facilitation of these attributes of the Internet, World Wide Web, and potentially of other network media, will help users to avoid the confusion inherent in current search engine result lists, making it less likely, for example, that a search for pictures of roses will return a picture of Axel Rose. Discovery of digital content information data in context offers higher quality, greater relevance and considerable advantage for its interpretation and use. In this way, the search user can discover new contextual knowledge about a subject. This cannot be done with standard web search engines.

Another embodiment of the present invention provides a customizable search engine that is easy to use. The user does not need to know how to program or have any special technical knowledge of computers. The user does not need to install any software to use this invention. This method does not render the user's computer, devices, resources or Internet connection unusable while it performs indexing. The user does not even need to have their own computer. It can be used from any device with Internet access including computers at schools or libraries and mobile devices. The advertising supported version can be free making it ideal for students. It is also easy to use because all the characteristics of the full text index are described in terms the user can understand without the need for any special technical knowledge on the part of the user.

Another embodiment provides a modular search engine that is more flexible than existing Internet search engines. The search engine can have modular software components. This allows replacement of individual modules without replacing the entire search engine or changing the user interface. For example, the software module that follows links may be replaced by another piece of software if it is found to have superior link following capabilities to crawl such things as dynamic digital content or links. The actual search module can also be swapped out and replaced with another module as required to support, among other things, digital content data resource files in different languages. Conventional Internet search engines rely on their own proprietary crawler, search and index methods. If the method is not well suited to what is being indexed, it cannot be changed easily. Consequently, users are deprived of the ability to find information they need, being placed instead at the mercy of individuals who program the conventional search engines, persons who have little knowledge or understanding of the user's ultimate requirements. The fact that the components can be changed without changing the user interface also makes it easier for the user because they can get the benefit of components better suited to their search requirements without having to learn a new user interface for the search engine they are using.

Another embodiment provides for advertising supported personal search. In this embodiment, the audience for the advertisements is more likely to be interested in the advertisements and act on them because advertisements can be targeted to the users based on information that they provided when they registered, including but not limited to demographic and psycho graphic information, the category of what they are searching for, the keywords they are searching for, and the actual digital content resource data files they are searching. This provides many ways to target the user's interests.

In another embodiment, the system includes the following components: a user interface, a place to store information about the user and the user's searchable index, a component that can crawl the digital content data resources according to the criteria set by the user, a searchable full text index, a component that can search that index, a component to serve advertising for the advertising sponsored version, and a component to manage the sale of advertising for the advertising sponsored version and sale of the service for fees. The user interface component runs on the user's Internet capable computer or device. All the other components run on a server or group of servers. The user interface and the server components are connected via a network.

In another embodiment, the user interface component is where the user creates, changes, manages, and performs searches on the personal search engine. In the advertising supported version advertisements can be displayed on the user interface while the user is doing this.

The user signs up for the service via the user interface. The user can choose to sign up for the free or paid version of personal search. The user interface component collects the required information for the type of service the user has chosen. Once signup is complete the user interface collects the search engine characteristics from the user. These characteristics may include, but are not limited to, the digital content data resource files to search, the depth to follow links from the starting point and the time interval to refresh the information. Once the index is built, the user is able to search the index that has been created via the user interface. The user interface is connected to the index via a network. Advertisements may be displayed to the user while they are logged in based on information obtained from them. This may be done by the advertising server component.

In another embodiment, the user's signup and search engine characteristics information gathered via the user interface is stored in the database component on the server. The characteristics information may be transmitted from the network device, such as a PC, to the server via a network connection. The server may retrieve that information whenever it is needed, for example, when a user of the advertising supported version is logged in. The information stored in the database may comprise a user's login, identification, interests and account type information, digital content data resource files to search, the depth to follow links from the starting point and the time interval to refresh the information.

When it is time to do the initial crawl or refresh the information for a user's search engine the digital content data resource files to search, and the depth to follow links from the starting point are retrieved from the database by the crawler component and used to crawl the digital content information resource files chosen by the user. The crawler component accesses the digital content resource data files to crawl via a network. The output of the crawler component is the full text index for the user's search engine. This index is stored on a server. When the crawl is over the database is updated to reflect that a refresh of the search engine has occurred.

The information in the full text index is now ready to be searched by the search component. The user enters the search criteria and the search component retrieves references to it. In another embodiment, a pure text search engine may be used due to its great accuracy for small collections of digital content resources. However, embodiments of this invention are not limited to the use of a pure text search engine. For example, an engine that uses a ranking algorithm could be employed. The search engine component may reside on a server or servers and communicates with the user interface component via a network.

In another embodiment, if the user has an advertising supported account, the advertising server displays advertising to the user via the user interface based upon but not limited to information obtained from them when they signed up, their search terms and the contents of their search engine. The advertising server component may reside on a server or servers and communicates with the user interface component via a network. The advertising may be selected and served dynamically based on a match of the advertising characteristics chosen by the advertiser to the search users characteristics.

Benefits to the searcher are as follows: The search engine described above is completely modular and can be controlled by an ordinary person with no programming skill via any browser capable device including but not limited to computers and mobile devices. With the advertising supported option it is free to the user making it broadly applicable. Students, librarians, teachers, and others using computers in schools and libraries can use it. It minimizes information clutter by providing a more efficient method to find the information desired by the user. This method of search provides information that is timelier, more relevant, and more contextual to the user. The personal search engine can be used anytime; anywhere there is network access for the user's device. Since there is an advertising supported version that is provided at no cost to the user it is available to anyone with network access via a browser capable device. The personal search engine is immune to search engine spam, which is excessive manipulation to influence search engine rankings, often for pages that contain little or no relevant content. As the amount of information on the Web grows, the incidence of search engine spam is increasing, as more sites compete to be noticed on search engine results. The subject invention, furthermore, offers a solution that is immune to arbitrary changes in site rankings, or site index inclusion, resulting from unannounced, undocumented changes to search engine algorithms.

For the advertiser there are also benefits over other types of online advertising. This method provides more ways to target the advertising to the user than other methods. It is not merely targeted by the search keyword but can be targeted by words in the full text index of the user's digital content data resources, and information obtained from the user when they signed up including but not limited to demographic, and psycho graphic information. Since all the above information is obtained directly from the user it is highly targeted to their interests which should make it more effective advertising and provide better return on investment for the advertiser and result in the user finding the advertising to provide value added to their search experience.

These and other objects and features of the present invention will become readily apparent from the detailed description, which is to be read in conjunction with the accompanying drawings.

DESCRIPTION OF THE PREFERRED EMBODIMENT

In the following detailed description, numerous specific details are set forth in order to provide a thorough understanding of the present invention. It will be apparent to one of ordinary skill in the art however, that these specific details need not be used to practice the present invention. In other instances, well known structures, interfaces and processes have not been shown in detail in order not to unnecessarily obscure the present invention.

Figure 1:
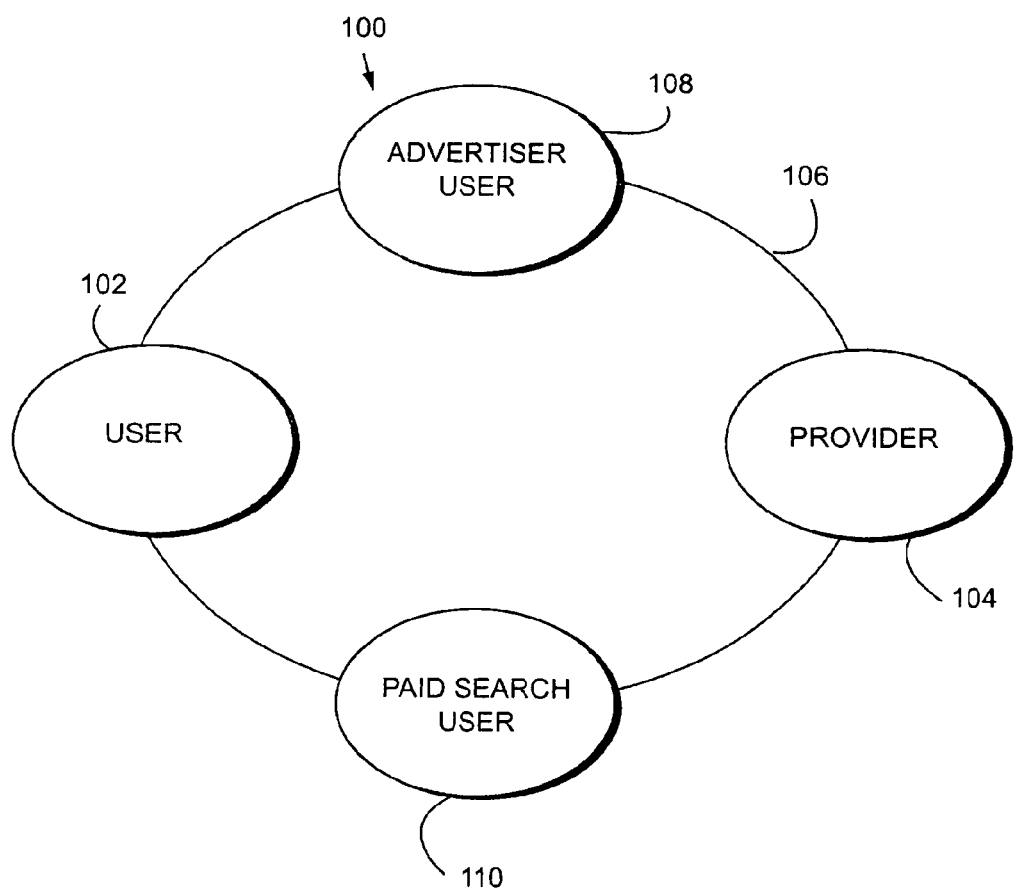
FIG. 1 is a diagram depicting an approach for the personal search engine according to an embodiment.

One embodiment of the present invention relates to a method and system for storing and delivering search indexes and search results via a network. FIG. 1 is a block diagram that illustrates one embodiment that provides personal search capability, delivers advertising, and sells advertising to advertisers. As used herein, the term "advertising" refers to any type of advertising that can be transmitted through a network to a browser-capable device. Examples of browser-capable devices include, but are not limited to, personal computers, personal digital assistants, cell telephones and other mobile devices. Examples of the advertising described herein include, but are not limited to, text links, animations and digital sound files. Advertising targeting data can include, but is not limited to, search keywords, search categories, and user demographic and psycho graphic information collected when the user registers for the advertising supported version of the search service. In general, the user can determine the digital content data resources, search criteria, depth of crawl and refresh interval for their personal search engine. Thus, the user is not constrained by the digital content data resource, crawl depth and refresh interval decisions made by the operators of conventional search engines.

FIG. 1 shows an embodiment for a user controlled search engine system 100. The system 100 includes a user 102, paid search user 110, advertiser 108, and provider 104 interconnected by link 106. Users 102 and 110 are users of the search engine according to embodiments of the present invention. Advertiser 108 is an advertising provider that provides advertising for display by provider 104 and viewing by users 102 and 110. Provider 104 is a search engine provider that provides search engine functionality to users 102 and 110.

According to this embodiment, the search user 110 may pay a fee to create a personal search engine, and may pay additional fees for enhanced functionality, including, but not limited to, number of digital content data resources, crawl depth, and refresh interval over a link 106. The link 106 may be any medium for transferring data between user 110 and provider 104. Examples of the link 106 include, without limitation, a network such as a LAN, WAN, the Internet, a telecommunications link, a wire or optical link, or a wireless connection.

According to another embodiment, the user 102 creates a personal search engine in return for agreeing with provider 104 to view advertising based on information the user 102 furnishes, including, but not limited to, the user's 102 demographic data, psycho graphic data, categories searched by the user 102, and search terms entered by the user 102.

According to another embodiment, the user 108 buys targeted, advertising presentation services from provider 104. The advertising user 108 buys the capability to target presentation of their advertising according to, but not limited to, advertising supported version search user demographic data, psycho graphic data, search categories and search terms entered by users of the advertising supported version of the personal search engine service.

Figure 2:
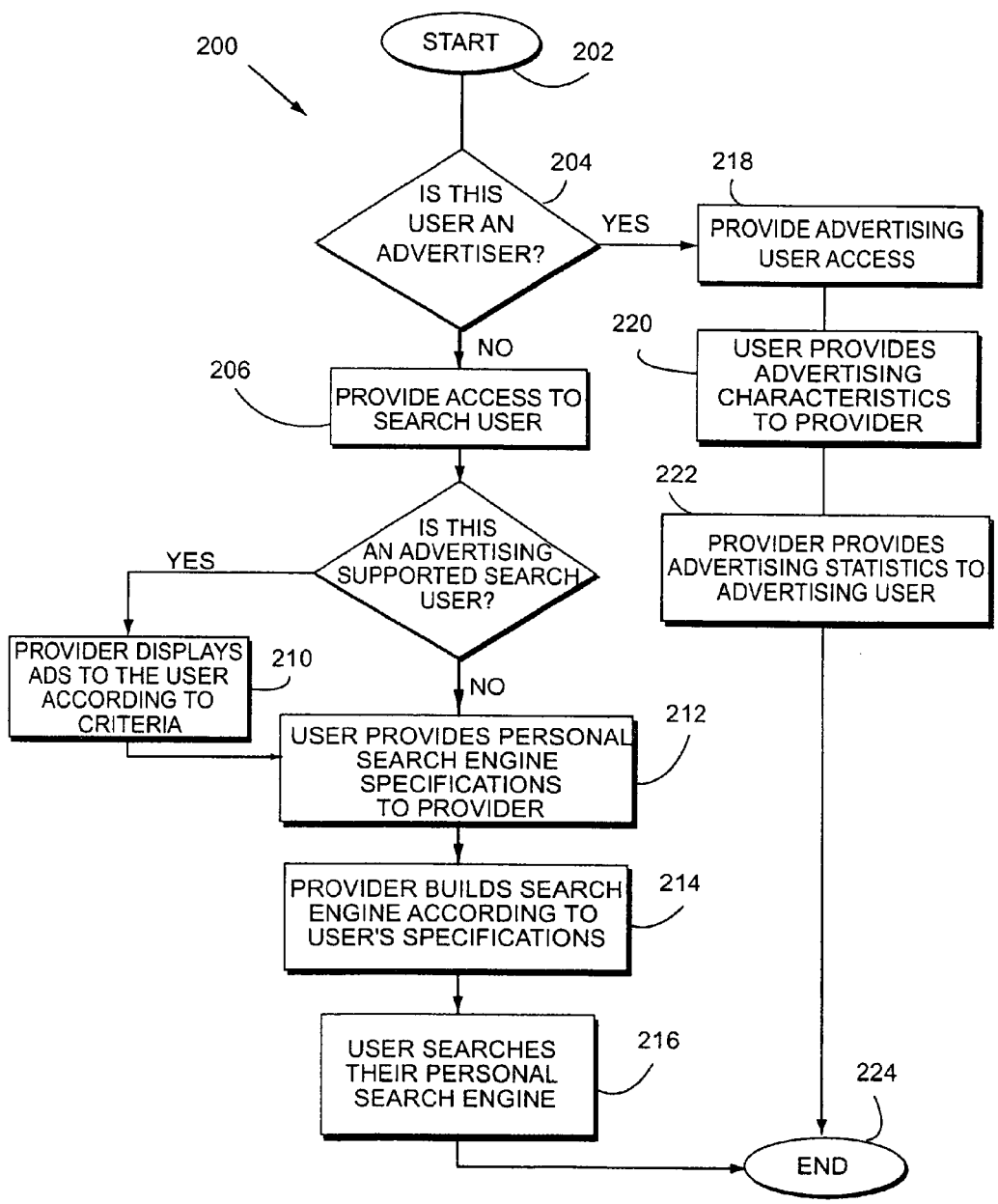
FIG. 2 is a flow diagram depicting an approach for the personal search engine according to an embodiment.

FIG. 2 shows an embodiment for providing a personal search engine 200 and advertising presentation services to users. After the process is initiated (202), the user 201 indicates whether they are a personal search engine user or an advertiser (204). If the user 201 indicates that they are a personal search engine user, the process provides access to the personal search engine function (206). The provider 203 determines whether the user 201 is an advertising-supported user (208). If the provider 203 determines that the user 201 is an advertising supported search user, then provider 203 presents advertisement to user 201 according to targeting criteria (210). User 201 provides personal search criteria to provider 203 (212). Provider 203 builds the personal search engine according to the search engine specifications provided by the user 201 (214). User 201 conducts one or more searches for information using their personal search engine (216). The process is then complete (224). If the user 201 is a user for advertising presentation services, then provider 203 provides user 201 with access to the advertising purchase module (218). The user 201 provides provider 203 with advertising characteristics information (220). Provider 203 provides user 201 with statistics on advertising presented by provider 203 to date for advertising user 201 (222). Then this process ends (224).

Figure 3:
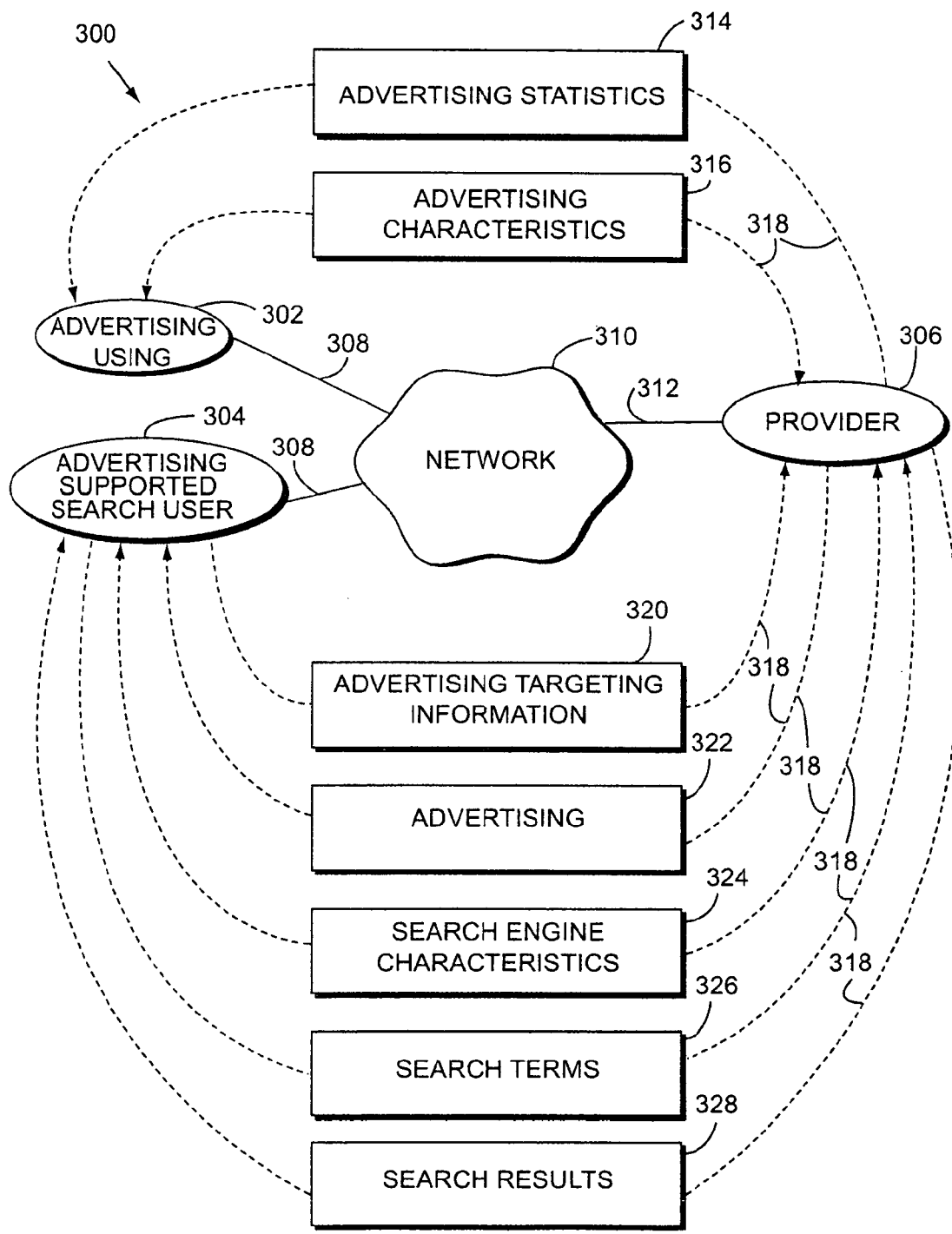
FIG. 3 is a diagram that depicts an approach for the advertising supported personal search engine over a network according to an embodiment.

FIG. 3 shows another embodiment that depicts an advertising supported personal search engine over a network 300. This embodiment may include an advertising user 302, an advertising supported search user 304, and a provider 306. The users 302, 304 and provider 306 communicate through network 310 over communication links 308 and 312. The network 310 may be any type of communication network such as the Internet, an intranet, a LAN, or a WAN. The communication links 308 and 312 may be any type of link that allows the parties to communicate with and through the network 310.

In this embodiment, the advertising user 302 receives advertising statistics 314 from provider 306 over communication link 318. Advertising user 302 and provider 306 may exchange advertising characteristics 316.

The user 304 may communicate advertising targeting information 320 to provider 306. In response, provider 306 may communicate targeted advertising 322 to user 304. In addition, the user 304 and provider 306 may exchange search engine characteristics 324 for creating a personal search engine for user 304 based on the search engine characteristics provided. When executing a search, user 304 communicates search terms 326 to provider 306. Provider 306, in turn, performs a search and communicates search results 328 to user 304. The performed search may be performed based on the search engine characteristics and the search terms provided by user 304.

Figure 4:
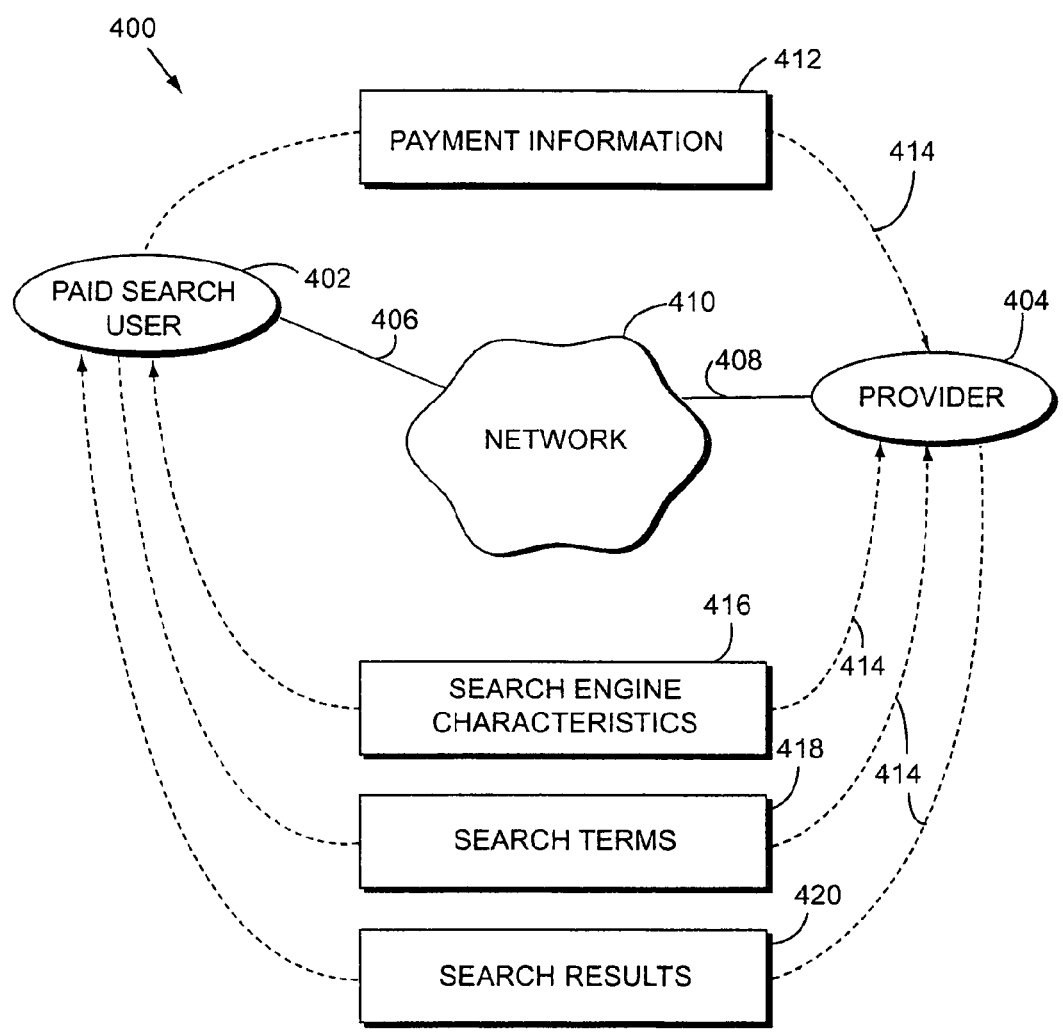
FIG. 4 is a diagram that depicts an approach for the paid personal search engine over a network according to an embodiment.

FIG. 4 shows another embodiment that depicts a paid personal search engine over a network 400. This embodiment may include a paid search user 402 and a provider 404. The user 402 and provider 404 communicate through network 410 over communication links 406 and 408. The network 410 may be any type of communication network such as the Internet, an intranet, a LAN, or a WAN. The communication links 406 and 408 may be any type of link that allows the parties to communicate with and through the network 410.

In this embodiment, the user 402 communicates payment information 412 to provider 404 over communication link 414. After payment information 412 has been received and processed, user 402 and provider 404 may exchange search engine characteristics 416 for creating a personal search engine for user 402 based on the search engine characteristics provided. When executing a search, user 402 communicates search terms 418 to provider 404. Provider 404, in turn, performs a search and communicates search results 420 to user 402. The search may be performed based on the search engine characteristics and the search terms provided by user 402.

Figure 5:
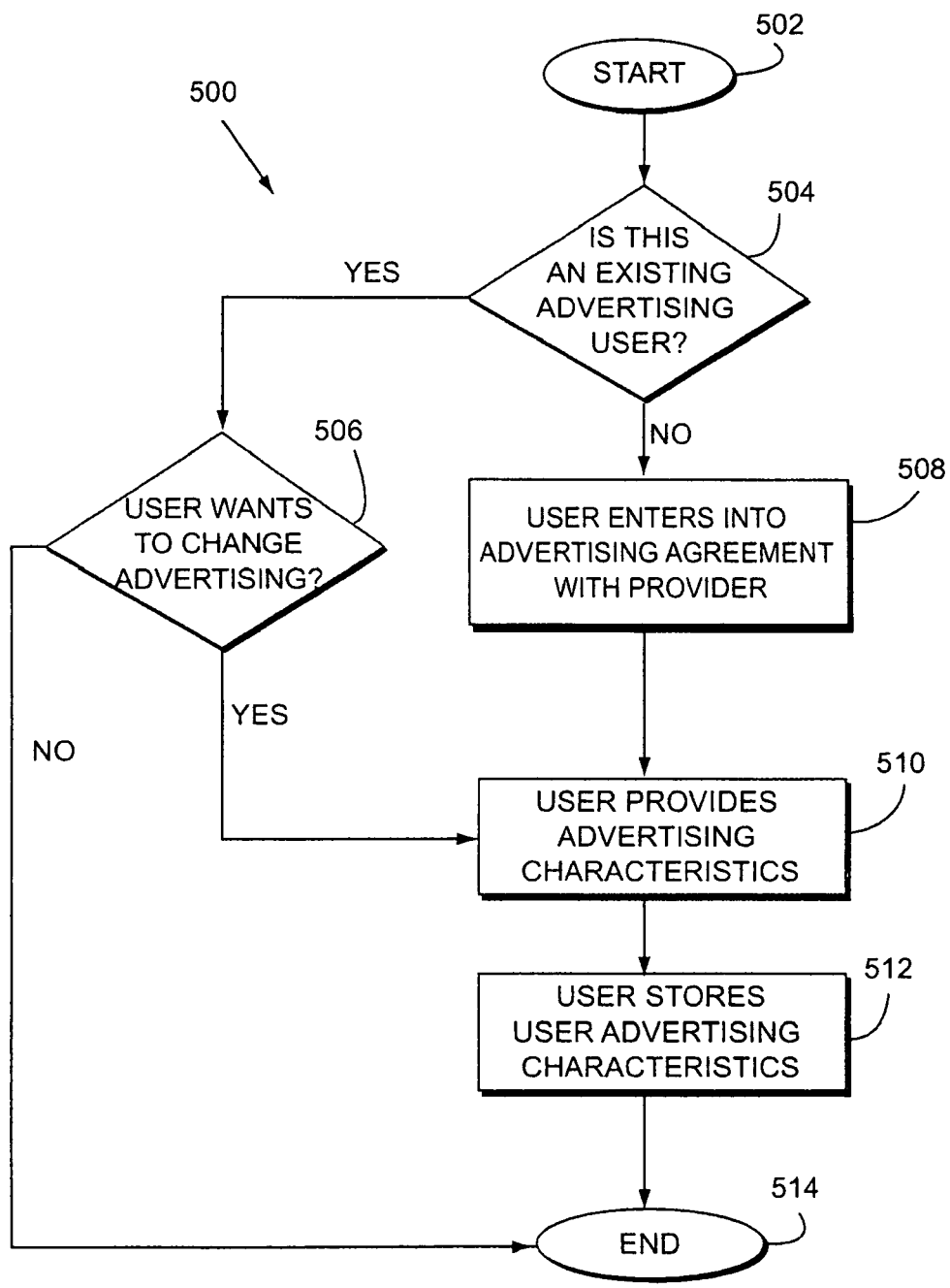
FIG. 5 is a flow diagram that depicts an approach for selling advertising on the advertising supported personal search engine to the advertising user according to an embodiment.

FIG. 5 shows another embodiment that depicts the process whereby an advertising user 505 buys advertising and enters the characteristics of that advertising which will be shown over a network. After the process is initiated (502), provider 503 determines whether this is a new or returning advertising user (504). If the advertising user 505 is a new user, the user buys advertising on the advertising supported personal search engine by entering into an advertising agreement with the provider 503 (508). The advertising user 503 provides the characteristics of the advertising to be purchased including but not limited to text, graphics, animation or audio to display, link click-through location, search key words for advertisement display, searcher demographic and psycho graphic for advertisement display, price of advertising, amount of advertising, method of payment and search category (510). If multiple advertising users 505 want the same characteristics they can competitively bid on them. Advertising users 505 with higher bids will have their ads display first or in a more visible position on the user interface. When the advertising user 505 has completed entering his information, the provider 503 stores the advertising user's 505 advertising characteristics (512). The process is then complete (514).

If the advertising user 505 is a returning advertising user, provider 503 determines if the advertising user 505 wants to change the stored advertising characteristics (506). If the advertising user 505 does not want to change his advertising characteristics, the process is then completed (514).

If the advertising user 505 wants to change the stored characteristics, the provider 503 displays the advertising user 505's current advertising characteristics via the user interface including but not limited to text, graphics, animation or audio to display, link click-through location, search key words for advertisement display, searcher psycho graphic and demographic for advertisement display, price of advertising, amount of advertising, method of payment and search category (512). Alternatively, the provider 503 can display the stored characteristics before the user 505 determines if they want them changed (506). The returning advertising user 505 updates the characteristics of the advertising to be purchased including but not limited to text, graphics, animation or audio to display, link click-through location, search key words for advertisement display, searcher psycho graphic and demographic for advertisement display, price of advertising, amount of advertising, method of payment and search category (510). When the advertising user 505 has completed entering his information, the provider 503 stores the update to the advertising user's 505 advertising information (512). This process ends in step 514.

Search User Agreement Process

Figure 6:
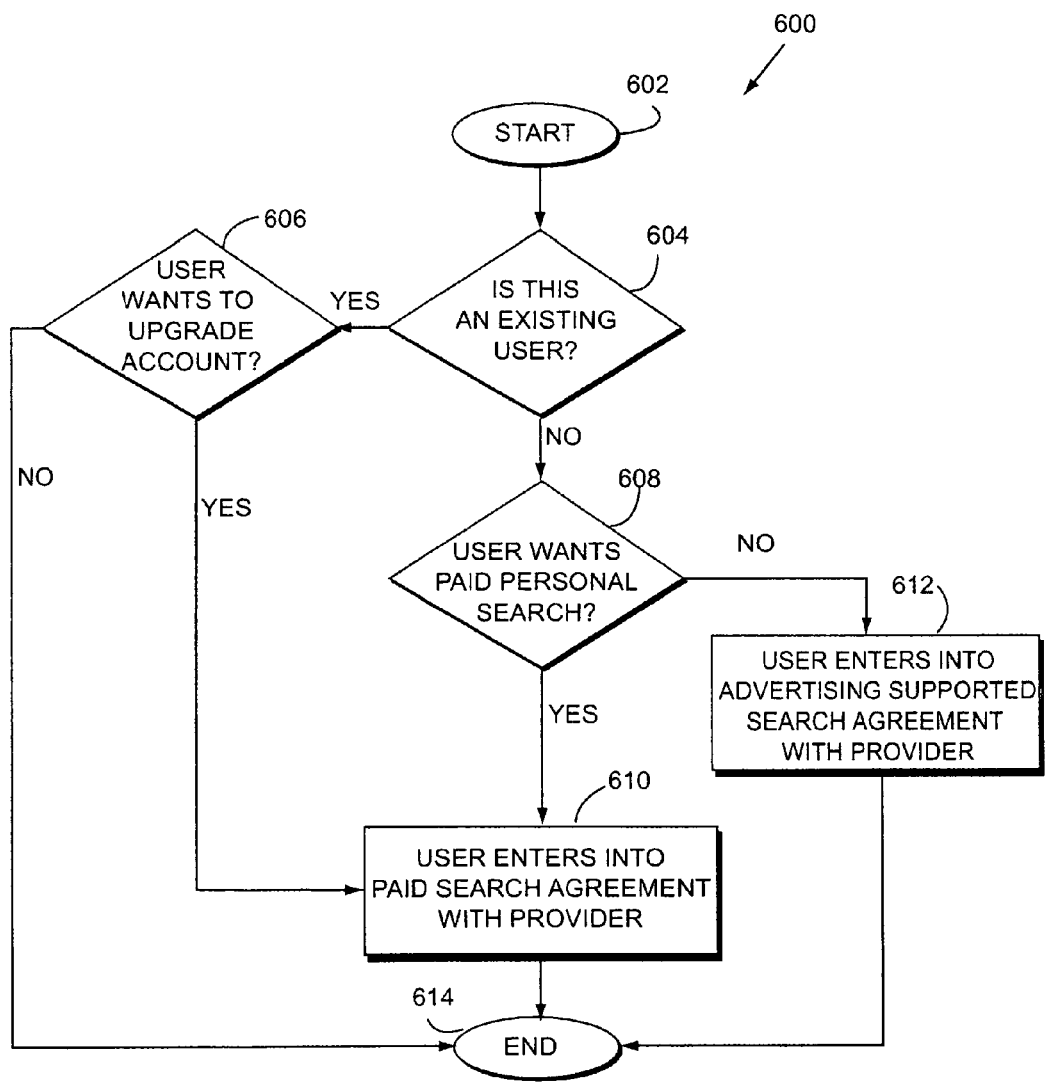
FIG. 6 is a flow diagram that depicts an approach for entering into an agreement with the personal search user who wants to create a personal search engine according to an embodiment.

FIG. 6 is a flow diagram that depicts the personal search user agreement process. Provider 603 determines whether this is a new or returning search user 601 (604). If the search user 601, is a returning search user the provider 603 queries the search user if he wants to upgrade his account (606). If the search user 601 wants to upgrade his account the search user 601 enters into an upgrade paid personal search account agreement with the provider 603 (610). This account upgrade consists of but is not limited to an upgrade of an advertising supported personal search account to a paid account. The paid account permits the search user 601 to use more resources for his personal search engine and to have a personal search engine without advertising display. In this way the advertising supported search user 601 becomes a paid search user.

If the provider 603 determines that the search user 601 is a new search user 601 (604), then the provider 603 queries the user 601 to determine if the search user 601 wants a paid or an advertising-supported personal search account (608). If the search user 601 wants a paid personal search account, then search user 601 enters into a paid personal search agreement with the provider 603 (610). The search user 601 can pay the provider 603 for the paid personal search account by means consisting of but not limited to credit cards, debit cards or online electronic payment systems such as Paypal. The provider 603 displays the terms of use and privacy statements to the search user 601 and the search user 603 must agree to terms of use and privacy statement (610).

If the search user 601 wants an advertising supported personal search account, the search user 601 enters into a advertising supported personal search agreement with the provider 603 (612). The advertising supported search user 601 may provide the provider 603 with information about the advertising supported search user 601 and the user's search in return for the account. This information may include but is not limited to demographic information about the search user 601, psycho graphic information about the search user 601, category information about the advertising supported search user's 601 search and permission to use the advertising supported search user's 601 searches and search engine content for purposes including but not limited to targeted advertising. The advertising supported search user 601 may agree to the provider's 603 terms of use and privacy policy for advertising supported personal search. This process is complete (614).

Obtain Personal Search Engine Characteristics from User Process

Figure 7:
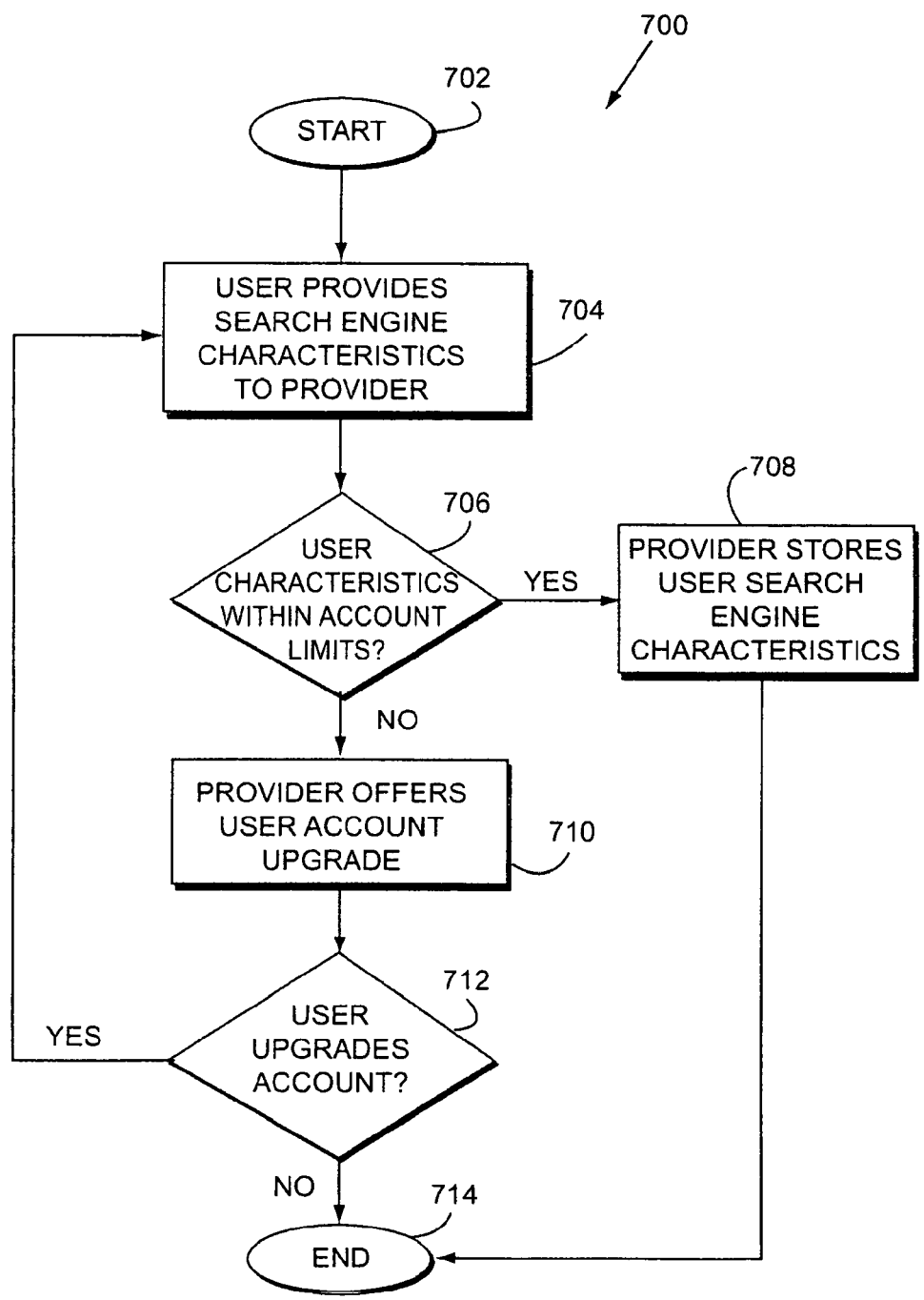
FIG. 7 is a flow diagram that depicts an approach for obtaining the characteristics of the personal search engine from the personal search engine user according to an embodiment.

FIG. 7 is a flow diagram that depicts the process where the search user 701 provides the provider 703 with the characteristics of his personal search engine. The search user 701 provides his search engine characteristics to the provider 703 (704). These characteristics may include but are not limited to the digital content data sources to be crawled and indexed, the crawl criteria for these digital content data sources and the time interval to refresh the digital content index in the personal search engine. These digital content data sources may include, but are not limited to hypertext markup language (HTML) pages, uniform resource locator (URL) names or numbers, Web sites and text files in various formats. The search user 701 provides the path to find these files over a network. The network may include but is not limited to the Internet and intranets. The crawl criteria may include but are not limited to the number of links from the initial digital content resource to crawl (link depth) and the time interval to refresh the digital content resource data in the personal search engine (re-crawl the digital content data sources). The provider 703 checks the search user's 701 search engine characteristics against the limits for those characteristics for the search user's account (706). These characteristics may include but are not limited to number of digital content data resources such as web sites, HTML files and text format files to crawl, the link depth from the initial digital content resource to crawl and the crawl refresh interval. If the personal search engine characteristics are within the search user's 701 account limits, the provider 703 stores the search user's 701 personal search engine characteristics (708). If the search user 701 has exceeded the limits of his account with any of the characteristics of his search engine including but not limited to the number of digital content data resources such as web sites, HTML files and text format files to crawl, the link depth from the initial digital content resource to crawl and the crawl refresh interval, the provider 703 offers to upgrade the search user's 701 account to raise the search user's 701 account limits for the characteristics of his search engine including but not limited to number of digital content data resources such as web sites, HTML files and text format files to crawl, the link depth from the initial digital content data resource to crawl and the crawl refresh interval (710). If the search user 701 upgrades his account the search user 701 may add additional characteristics to his personal search engine up to the limits of his upgraded account including but not limited to the number of digital content data resources such as web sites, HTML files and text format files to crawl, the link depth from the initial digital content data resource to crawl and the crawl refresh interval (712). This process is complete (714).

Build Personal Search Index Process

Figure 8:
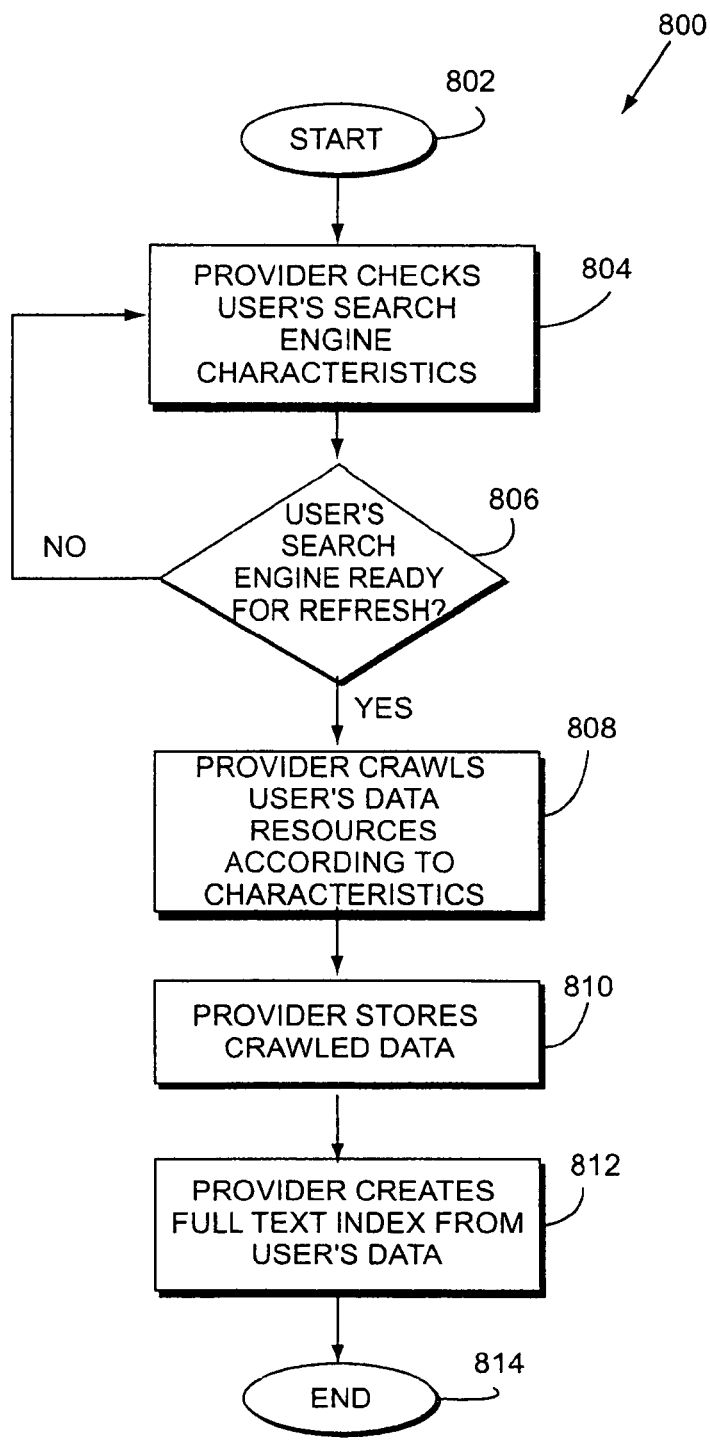
FIG. 8 is a flow diagram that depicts an approach for building the personal search engine based on the characteristics specified by the user according to an embodiment.

FIG. 8 is a flow diagram that depicts how a personal search index is built according to one embodiment. The provider 803 builds the personal search index for the search user 801 according to the search user's 801 characteristics for their personal search engine. The provider 803 checks the search user's 301 search engine characteristics to determine if the provider 803 should refresh the user's 801 personal search engine (804). If the provider 803 determines that it is time to refresh the search user's 801 personal search engine (806), the provider 803 crawls the search user's 801 digital content data resources to the search user's 801 personal search engine characteristics over the network (808). These characteristics may include but are not limited to specified link depth and refresh interval. The network may be but is not limited to the Internet or an intranet. The provider 803 stores the crawled text data that was sent back to the provider 803 via the network (810). The provider 803 creates a full text index from the crawled digital content resource data to create the search user's personal search engine (812). This process is complete (814).

User Searches Personal Search Engine Process

Figure 9:
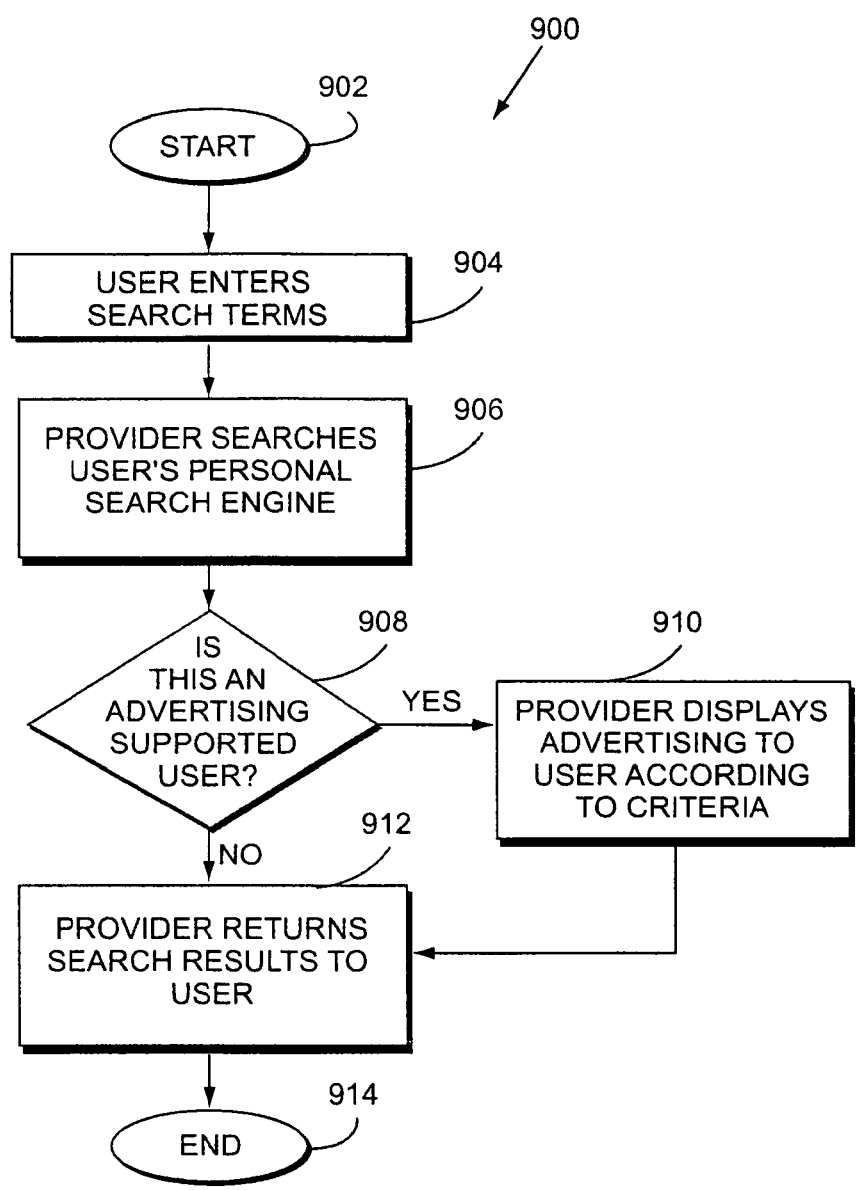
FIG. 9 is a flow diagram that depicts an approach to the user searching their personal search engine according to an embodiment.

FIG. 9 is a flow diagram that depicts the process where the search user 901 searches their personal search engine according to one embodiment. The search user 901 enters their search term(s) and they are sent to the provider 903 via a network, which may be but is not limited to the Internet or an intranet (904). The provider 903 searches the search user's 901 personal search engine for digital content resources matching the search term (906). The provider 903 checks if this search user 901 is an advertising supported personal search user 901 (908). If the search user 901 is an advertising supported personal search user 901, the provider 903 displays advertising to the advertising supported search user 901 according to the advertising criteria obtained from the advertising user 905 by the provider 903 (910). The targeting for this advertisement may be but is not limited to contextual, demographic, and psycho graphic characteristics of the advertising supported search user 901 and his search engine. The advertising is sent to the advertising supported search user 901 via a network, which may be but is not limited to the Internet or an intranet. The advertising format may be but is not limited to text links and graphic ads. It may be presented anywhere on the page where it can be seen by the advertising supported personal search user 901. The provider 903 returns the search results to the advertising supported search user 901, via the network (912). The search results may be organized or ranked in some way for presentation to the search user 901 including but not limited to search term frequency in the digital content data resource. This process ends (914).

Display Ads to Advertising Supported Search User Process

Figure 10:
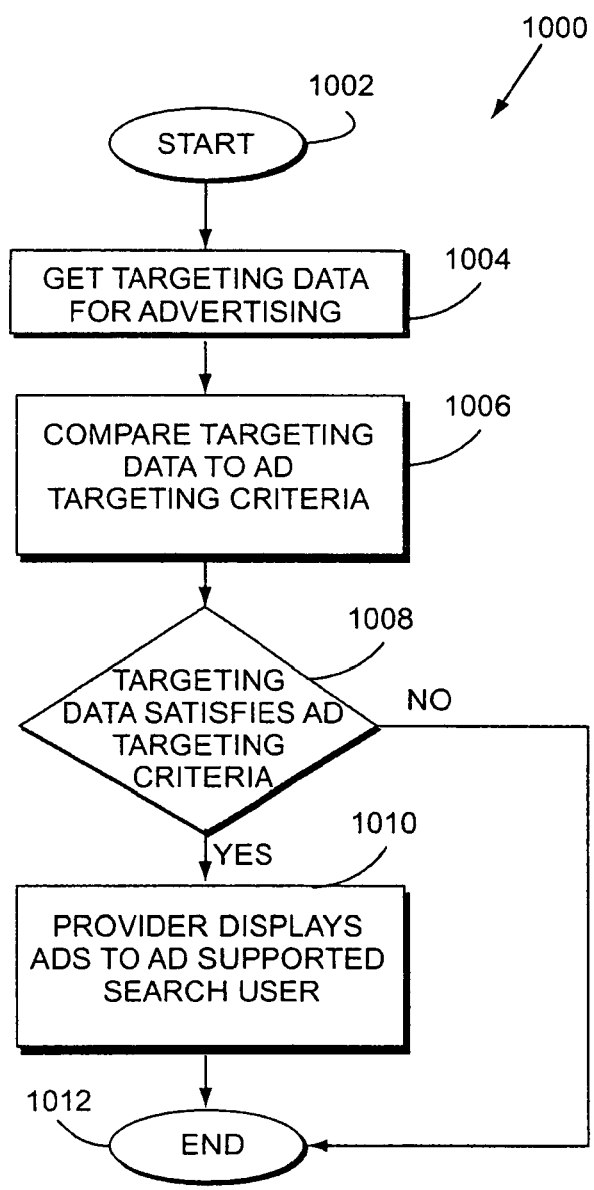
FIG. 10 is a flow diagram that depicts an approach for selecting the advertisements to be displayed to the user of the advertising supported personal search engine according to an embodiment.

FIG. 10 is a flow diagram that depicts a process to display advertising to the advertising supported personal search user 1001 according to one embodiment. The ads may be displayed over a network. The provider 1003 receives data about the search user 1001 and the search user's 1001 search via a network.

This data may include but is not limited to demographic information about the search user 1001, psycho graphic information about the search user 1001, category information about the search user's 1001 search, the keywords the search user 1001 is searching for and the information in the search user's 1001 personal search engine. The provider 1003 compares the search user's 1001 information and search terms with advertising targeting criteria (1006). If the search user's 1001 information matches the advertising user's 1005 ad targeting characteristics (1008), the provider 1003 displays matching ads to the advertising supported search user 1001 over the network (1010). The provider 1003 may gather and provide statistics about the advertising for the advertising user 1005 including but not limited to the number of clicks each advertisement has received by date and time interval and the number of times each ad has been shown by date and time interval and the cost of the advertising to date. This process ends (1012).

Personal Search System Block Diagram

Figure 11:
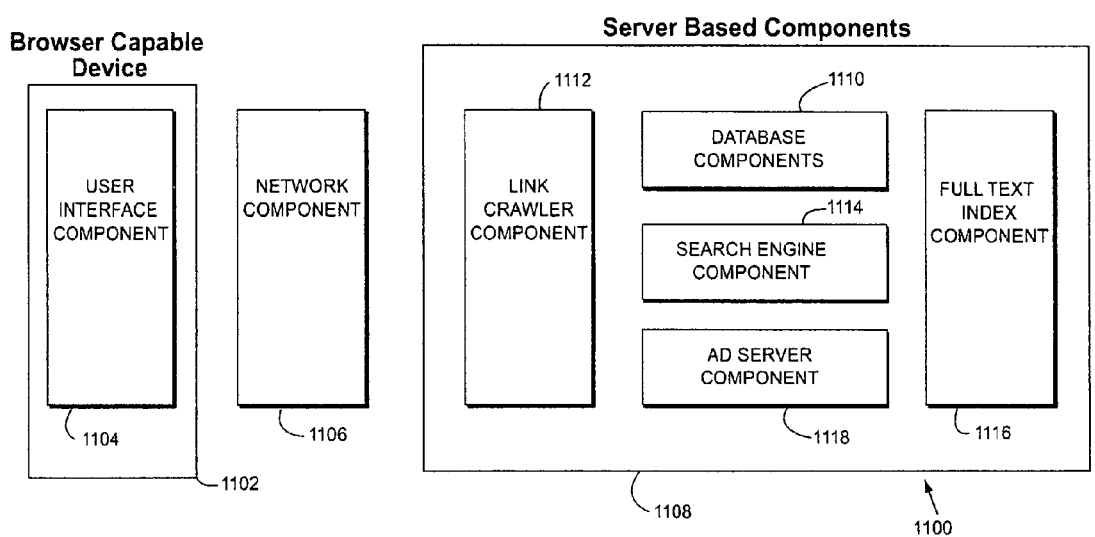
FIG. 11 is a block diagram showing all the parts of the personal search engine according to an embodiment.

FIG. 11 is a block diagram, which shows one embodiment of a personal search system. As shown a personal search system may include a browser capable device 1102, a network component 1106 and server based components 1108.

The browser capable device 1102 provides the user interface component 1104 for the personal search system. The browser capable device 1102 may include but is not limited to personal computers, PDAs, cell phones and other mobile devices. The personal search system communicates with the user via the user interface 1104 on the browser capable device 1102.

The network component 1106 connects the browser capable device 1102 to the server based components 1108 and permits them to communicate. The network component 1106 may include but is not limited to the Internet, an intranet or a wireless network.

The server components 1108 of the personal search system may include a database component 1110, a link crawler component 1112, a search engine component 1114, a full text index component 1116 and an ad server component 1118. The database component 1110 stores information which, may include the search engine characteristics of the search user and the advertising characteristics of the advertising user of the personal search system. These characteristics are received from the user interface component 1104 on the browser capable device 1102 via the network component 1106. The link crawler component 1112 crawls the digital content data resources, which are part of the search user's personal search engine characteristics according to crawl specifications in the search engine characteristics entered by the search user via the user interface component 1104 and stored in the database component 1110. These crawl characteristics may include but are not limited to the link depth to crawl from the starting digital content data resource, and the crawl refresh interval.

The link crawler component 1112 returns data from the digital content data resources it crawled, which is stored in the full text, index component 1116. The full text index component 1116 indexes that data which makes it searchable by the search user using the search engine component 1114. The search user enters his search terms via the user interface component 1104 on the browser capable device 1102. The network component 1106 sends the search term to the server components 1108 and more specifically to the search engine component 1114. The network component 1106 then sends the search results from the search engine component 1114 back to the search user to be displayed on the user interface component 1104 that is on the browser capable device component 1102.

For the ad supported embodiment of the personal search system the ad server component 1118 which is part of the server based components 1108 retrieves and displays ads which have been purchased by the advertising user via the user interface component 1104 where the advertising characteristics match the characteristics of the advertising supported search user and their search. These characteristics may include but are not limited to demographic information about the search user, psycho graphic information about the search user, category information about the search user's 304 search, the keywords the search user is searching for and the information in the search user's personal search engine.

There is a benefit to the modular nature of the personal search system which makes it more flexible and expandable than a less modular system. Specific components may be changed or replaced with others to provide enhanced functionality or broader application. For example the link crawler component 1112 may be changed or replaced to enable it to crawl types of dynamic links that it could not crawl previously. This would enhance its functionality and the functionality of the whole personal search system because it could retrieve digital content resources for search that it could not retrieve before. Likewise the full text index component 1116 and the search engine component 1114 may be replaced or changed to process additional languages not previously supported by the personal search system thereby enhancing its functionality.

Implementation Mechanisms

Figure 12:
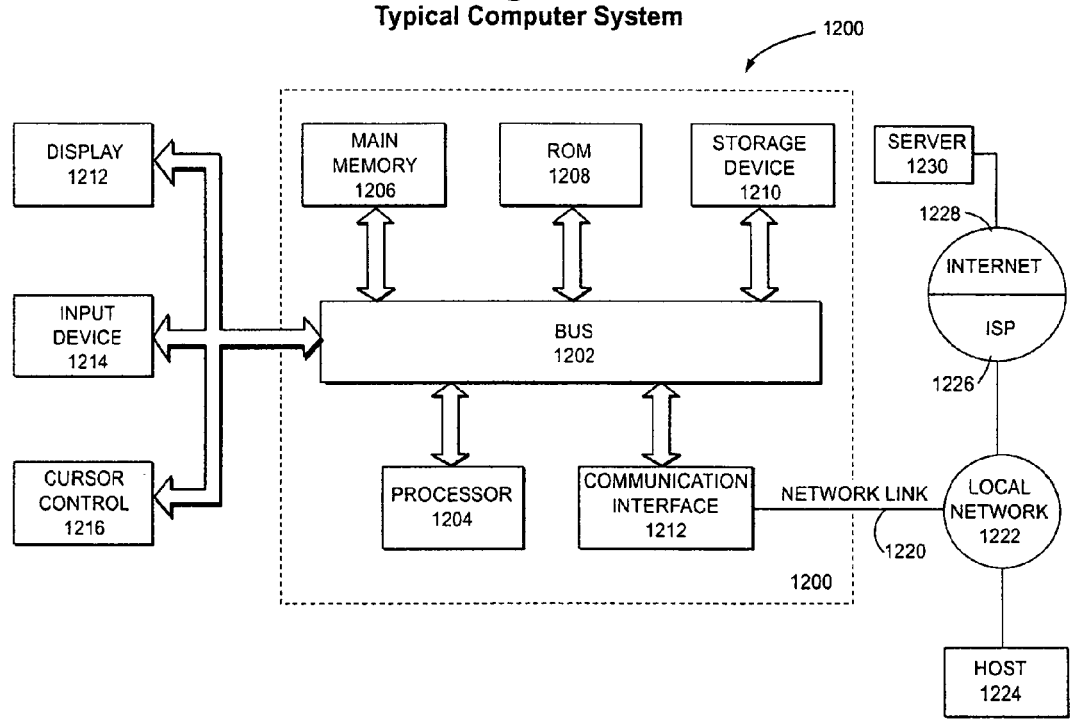
FIG. 12 is a block diagram of a computer system upon which embodiments of the invention may be implemented.

FIG. 12 illustrates a typical computer system 1200 in which one embodiment of the present invention can operate. One embodiment of the present invention is implemented on personal computer architecture. It will be apparent to those of ordinary skill in the art that other alternative computer system architectures, and other devices with the capability to interface with networks may also be employed.

In general, such computer systems as illustrated by FIG. 12 comprise a bus 1202 for communicating information, a processor 1204 coupled with the bus 1202 for processing information, main memory 1206 coupled with the bus 1202 for storing information and instructions for the processor 1204, a read-only memory 1208 coupled with the bus 1202 for storing static information and instructions for the processor 1204, a display device 1212 coupled with the bus 1202 for displaying information for a computer user, an input device 1214 coupled with the bus 1202 for communicating information and command selections to the processor 1204, and a storage medium 1212 coupled with the bus 1202 for storing information and instructions. The data storage medium 1210, such as a magnetic disk and associated disk drive, containing digital information is configured to allow processor 1204 access to the digital information on the storage medium 1210 via bus 1202.

Processor 1204 may be any of a wide variety of general-purpose processors or microprocessors such as the Pentium brand processor manufactured by Intel. Corporation. It will be apparent to those of ordinary skill in the art, however, that other varieties of processors may also be used in a particular computer system. Display device 1212 may be a liquid crystal device, cathode ray tube (CRT), or other suitable display device. Storage medium 1210 may be a conventional hard disk drive, floppy disk drive, CD-ROM drive, or other magnetic or optical data storage device for reading and writing information stored on a hard disk, a floppy disk, a CD-ROM, a magnetic tape, or other magnetic or optical data storage medium. Data storage medium 1208 may be a hard disk, a floppy disk, a CD-ROM, a magnetic tape, or other magnetic or optical data storage medium.

In the foregoing specification, the invention has been described with reference to specific exemplary embodiments thereof. Many changes or modifications are readily envisioned. The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A system for delivering a personal search engine software service, the system comprising:
   a server coupled to one or more components containing a link crawler component, one or more databases, a search engine component, and a full text index component;
   a browser capable device coupled to the server via a network and having a display device for presenting a graphical user interface that allows a user to define and submit personal search engine characteristics to the server;

wherein the personal search engine characteristics comprise one or more digital content resources to be crawled and indexed, one or more link depths for each digital content resource, and one or more refresh time intervals assigned to refresh respective digital content resources of a personal search engine generated according to the personal search engine characteristics;

the personal search engine delivered as a software service over the network, generated according to the personal search engine characteristics received from the browser capable device and configured to crawl, full text index and search the one or more digital content resources according to the personal search engine characteristics;

the personal search engine is configured to receive at least one search keyword;

the personal search engine is configured to enable the user to build the personal search engine by selecting the one or more digital content resources in the personal search engine;

the one or more databases configured to store the personal search engine characteristics and at least one user characteristic;

wherein the personal search engine is built as a module of the search engine component on the server;

the personal search engine is configured to dynamically refresh according to the one or more refresh time intervals for each of the respective digital content resources as defined in the personal search engine characteristics by using the link crawler component to automatically crawl and retrieve updated data from the respective digital content resources; and the full text index component configured to store the updated data retrieved by the link crawler component and index the updated data retrieved by the link crawler components into a format searchable by the user using the browser capable device to send the at least one search keyword to the personal search engine built on the server; and a display module configured to display search results on the display device when the at least one search keyword is identified within the one or more digital content resources in the personal service engine.

2. The system of claim 1, wherein the personal search engine is configured such that two or more modules of the personal search engine are distributed to reside at different servers.

3. The system of claim 1, further comprising an account status module configured to determine a status of an account of a user.

4. The system of claim 3, wherein the account status module determines whether an account for the personal search engine is an advertising supported personal search account; and if the account is an advertising supported personal search account, the account status module generates terms for a paid account to present to the user, wherein the paid account provides personal search engine services without displaying advertisement when the search results are displayed on the display device.

5. The system of claim 3, wherein the personal search engine is configured having at least one account limit;

wherein the account status module determines whether the personal search engine characteristics exceed any of the at least one account limits; and if the personal search engine characteristics exceed any of the at least one account limits, the account status module generates terms for an upgraded account to present to the user, wherein the upgraded account increases the account limits for characteristics of the personal search engine.

6. The system of claim 1, wherein the personal search engine comprises modular software components.

7. The system of claim 6, wherein the modular software components are configured such that a software module following at least one link is replaceable, during a crawl, by another software module having a superior link following capability.

8. The system of claim 1, wherein the personal search engine is built on high quality digital content resources selected by the user.

9. The system of claim 8, wherein, based on the at least one search keyword, the personal search engine retrieves the search results from the user selected high quality digital content resources.

10. The system of claim 1, wherein the personal search engine is built on high quality digital content resources selected by the user, eliminating low quality digital content resources and spam digital content resources.

11. The system of claim 1, further comprising:

an advertising module configured to receive advertising characteristics from a plurality of advertisers, wherein the advertising characteristics provide characteristics of the advertising to be purchased for advertisement display;

when at least two of the advertisers submit substantially similar advertising characteristics, the advertising module conducts a competitive bid auctioning process;

the one or more databases is further configured to store at least one advertising characteristic; and the display module configured to display the purchased advertisement on the display device when the at least one advertising characteristic matches at least one of the at least one user characteristic, at least one of the personal search engine characteristics, and the at least one search keyword.

12. The system of claim 11, wherein the at least one advertising characteristic comprises at least one of text, graphics, animation and/or audio display, link click-through location and search keywords for the advertisement display.

13. The system of claim 11, wherein the purchased advertisement comprises an animated with audio advertisement display.

14. A method for delivering a personal search engine software service, the method comprising:

providing a server coupled to one or more components containing a link crawler component, one or more databases, a search engine component, and a full text index component;

providing a browser capable device coupled to the server via a network and having a display device for presenting a graphical user interface that allows a user to define and submit personal search engine characteristics to the server;

wherein the personal search engine characteristics comprise one or more digital content resources to be crawled and indexed, one or more link depths for each digital content resource, and one or more refresh time intervals assigned to refresh respective digital content resources of a personal search engine generated according to the personal search engine characteristics;

providing the personal search engine delivered as a software service over the network, generated according to the personal search engine characteristics received from the browser capable device and configured to crawl, full text index and search the one or more digital content resources according to the personal search engine characteristics;

receiving at least one search keyword at the personal search engine;

building the personal search engine by enabling a user to select the one or more digital content resources in the personal search engine;

storing, in one or more databases, the at least one search engine characteristics and at least one user characteristic;

building the personal search engine as a module of the search engine component on the server;

dynamically refreshing the personal search engine according to the one or more refresh time intervals for each of the respective digital content resources as defined in the personal search engine characteristics by using the link crawler component to automatically crawl and retrieve updated data from the respective digital content resources; and storing, in the full text index component, the updated data retrieved by the link crawler component;

indexing, by the full text index component, the updated data retrieved by the link crawler components into a format searchable by the user using the browser capable device to send the at least one search keyword to the personal search engine built on the server; and displaying search results on the display device when the at least one search keyword is identified within the one or more digital content resources in the personal search engine.

15. The method of claim 14, wherein the personal search engine is configured such that two or more modules of the personal search engine are distributed to reside at different servers.

16. The method of claim 14, further comprising:
determining whether an account for the personal search engine is an advertising supported personal search account; and
if the account is an advertising supported personal search account, generating terms for a paid account to present to the user, wherein the paid account provides personal search engine services without displaying advertisement when search results are displayed on the display device.

17. The method of claim 14, further comprising:
establishing at least one account limit for the personal search engine;
determining whether the personal search engine characteristic exceeds any of the at least one account limit; and
if the search engine characteristics exceeds any of the at least one account limits, generating terms for an upgraded account to present to the user, wherein the upgraded account increases the account limits for characteristics of the personal search engine.

18. The method of claim 14, further comprising:
providing modular software components in the personal search engine, wherein the modular software components are configured such that a software module following at least one link is replaceable, during a crawl, by another software module having a superior link following capability.

19. The method of claim 14, further comprising building the personal search engine based on high quality digital content resources selected by the user that eliminates low quality digital content resources and spam digital content resources.

20. The method of claim 14, further comprising:
providing an advertising module configured to receive advertising characteristics from a plurality of advertisers, wherein the advertising characteristics provide characteristics of the advertising to be purchased for advertisement display;
when at least two of the advertisers submit substantially similar advertising characteristics, the advertising module conducts a competitive bid auctioning process;
storing, in the one or more databases, at least one advertising characteristic; and
displaying the purchased advertisement on the display device when the at least one advertising characteristic matches at least one of the at least one user characteristic, the at least one search engine characteristic, and the at least one search keyword.

21. A system for delivering personal search engine software services, the system comprising:
a server coupled to one or more components containing at least one of a link crawler component, one or more databases, a search engine component, and a full text index component;
a browser capable device coupled to the server via one or more networks and having a display device for presenting a graphical user interface that allows a user to define and submit one or more search engine characteristics to the server;
wherein the one or more search engine characteristics comprise one or more digital content resources to be crawled and indexed, one or more link depths for each digital content resource, and one or more refresh time intervals assigned to refresh respective digital content resources of one or more personal search engines generated according to the one or more search engine characteristics;
the one or more personal search engines delivered as software services over the one or more networks, generated according to the one or more search engine characteristics received from the browser capable device and configured to crawl, full text index and search the one or more digital content resources according to the one or more search engine characteristics;
the one or more personal search engines are configured to receive at least one search keyword;
the one or more personal search engines are configured to enable the user to build the one or more personal search engines by selecting the one or more digital content resources in the one or more personal search engines;
the one or more databases configured to store the at least one search engine characteristic and at least one user characteristic; and
wherein at least one of the personal search engines are built as a module of the search engine component on the server;
the one or more of the personal search engines are configured to dynamically refresh according to the one or more refresh time intervals for each of the respective digital content resources as defined in the one or more personal search engine characteristics by using the link crawler component to automatically crawl and retrieve updated data from the respective digital content resources; and the full text index component configured to store the updated data retrieved by the link crawler component and index the updated data retrieved by the link crawler components into a format searchable by the user using the browser capable device to send the at least one search keyword to the one or more personal search engines built on the server; and a display module configured to display search results on the display device when the at least one search keyword is identified within the one or more digital content resources in the one or more personal service engines.

\* \* \* \* \*